United States Patent Office 3,372,181
Patented Mar. 5, 1968

3,372,181
CARBONATES AND CARBAMATES OF 2,2-DIALKYL - 1,3 - PROPANEDIOL-(2,2,2-TRICHLOROETHYLCARBONATE)
Joseph V. Swintosky, Perkiomenville, Pa., assignor to Smith Kline & French Laboratories, Philadelphia, Pa., a corporation of Pennsylvania
No Drawing. Filed Aug. 24, 1965, Ser. No. 482,272
4 Claims. (Cl. 260—463)

This invention relates to novel substituted propanediol derivatives having valuable thereapeutic activity. More specifically this invention relates to trichloroethylcarbonate substituted propanediols having the following structural formulas:

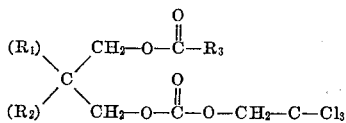

in which:

$R_1$ is methyl or ethyl, $R_2$ is a lower alkyl group having from two to four carbon atoms, and $R_3$ is —O—$CH_2$—C—$Cl_3$, $NH_2$ or $NHR_4$, $R_4$ being a lower alkyl group having from one to four carbon atoms.

The preferred and most advantageous compounds of this invention are 2-methyl-2-propyl-1,3-propanediol, bis-(2,2,2-trichloroethylcarbonate and 2-methyl-2-propyl-1,3-propaneliol, monocarbamate, trichloroethylcarbonate.

The novel compounds of this invention have central nervous system activity when internally administered to mammals. More specifically these compounds are useful as mild tranquilizers and muscle relaxants.

The 2,2-disubstituted bis trichloroethylcarbonate of Formula I in which $R_1$ and $R_2$ are defined above is prepared by reacting the properly 2,2-disubstituted-1,3-propanediol with trichloroethylchloroformate in an organic solvent according to the following synthetic procedure:

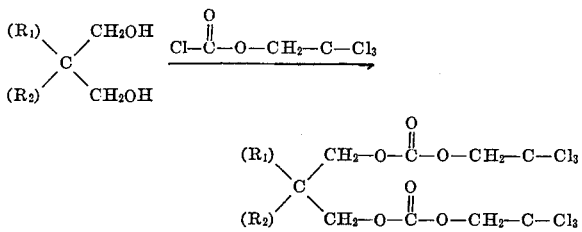

The monocarbamate trichloroethylcarbonate derivative of Formula I in which $R_1$, $R_2$ and $R_3$ are defined above is prepared by reacting trichloroethylchloroformate and the properly 2,2-disubstituted-3-hydroxypropyl carbamate in an organic solvent according to the following synthetic procedure.

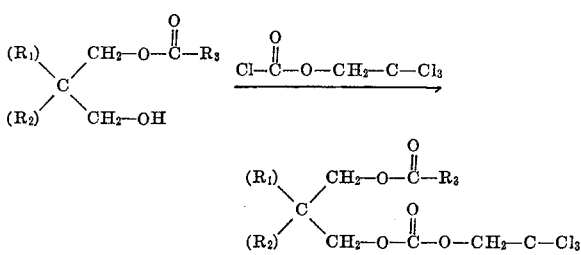

The preparation of the starting materials, the 2,2- disubstituted-1,3-propanediols and the 2,2-disubstituted-3-hydroxypropyl carbamates used in the above reactions is outlined in U.S. Patent No. 2,937,119.

The trichloroethylcarbonate propanediol derivatives as represented by the above formula are advantageously employed in combination with either a liquid or solid non-toxic pharmaceutical carrier. A wide variety of pharmaceutical forms useful for oral ingestion may be employed. Advantageously the preparation may take the form of tablets, capsules, powders, troches or lozenges. When a solid form is employed the pharmaceutical carrier may be, for example, lactose, magnesium stearate, starch, gums such as acacia, terra alba, stearic acid, sorbitol, mannitol, ethyl cellulose or gelatin. The amount of solid carrier will vary widely but preferably is from about 25 mg. to about 1 gm. If a liquid carrier is used the preparation can be in the form of a soft gelatin capsule, placed in an ampule or in a liquid suspension.

The pharmaceutical forms comprising the above novel trichloroethylcarbonate derivatives of substituted propanediol are administered in dosage units internally, preferably orally. Advantageously equal daily doses are administered to provide a daily dosage regimen which produces muscle relaxant and mild tranquilizing activity.

The following examples are not limiting but are illustrative of compounds of this invention and the procedures for their preparation.

EXAMPLE 1

To a solution of 42.4 g. of trichloroethylchloroformate in 100 ml. of chloroform is slowly added with stirring and cooling a solution of 13 g. of 2-methyl-2-propyl-1,3-propanediol in 16.2 ml. of pyridine and 100 ml. of chloroform. Stirring is continued for approximately four hours at room temperature and the mixture is then washed with water and dried over anhydrous magnesium sulfate. The solvent is removed and the residue is vacuum distilled at 177–178.5° C./0.3 mm. to yield 2-methyl-2-propyl-1, 3-propanediol, bis-(2,2,2-trichloroethylcarbonate) as a light yellow oil.

EXAMPLE 2

To a solution of 42.4 g. of trichloroethylchloroformate and 16 g. of pyridine in methylene chloride is added a solution of 33.6 g. of 2 - methyl - 2 - propyl-3-hydroxypropyl carbamate in methylene chloride. The solution is stirred for approximately four hours at room temperature and the solution is then washed with dilute hydrochloric acid and water and dried. The solution is distilled at 160° C./0.1 mm. to yield 2-methyl-2-propyl - 1,3-propanediol, monocarbamate, trichloroethylcarbonate as a light yellow oil.

EXAMPLE 3

Employing the general procedures outlined in the above Example 2 for the monocarbamate trichloroethylcarbonates, similar transformations give the following results:

(A) *Starting material.*—2-methyl - 2 - ethyl - 3 - hydroxypropyl carbamate.
*Product.*—2 - methyl-2-ethyl - 1,3-propanediol, monocarbamate, trichloroethylcarbonate.

(B) *Starting materials.*—2 - methyl - 2 - isopropyl-3-hydroxypropyl carbamate.
*Product.*—2 - methyl - 2 - isopropyl-1,3-propanediol, monocarbamate, trichloroethylcarbonate.

(C) *Starting material.*—2 - methyl - 2n - butyl-3-hydroxypropyl carbamate.
*Product.*—2-methyl - 2n - butyl - 1,3 - propanediol, monocarbamate, trichloroethylcarbonate.

(D) *Starting material.*—2 - ethyl - 2 - isopropyl-3-hydroxypropyl carbamate.
*Product.*—2 - ethyl - 2 - isopropyl - 1,3-propanediol, monocarbamate, trichloroethylcarbonate.

(E) *Starting material.*—N - ethyl - 2 - methyl-2-propyl-3-hydroxypropyl carbamate.

*Product.*—2 - methyl - 2 - propyl-1,3-propanediol, N-ethyl-monocarbamate, trichloroethylcarbonate.

(F) *Starting material.*—N - n - butyl - 2 - methyl-2-propyl-3-hydroxypropyl carbamate.

*Product.*—2 - methyl-2-propyl-1,3-propanediol, N-n-butyl-monocarbamate, trichloroethylcarbonate.

EXAMPLE 4

Employing the general procedures outlined in the above Example 1 for the bis - 2,2,2-trichloroethylcarbonates, similar transformations give the following results:

(A) *Starting material.*—2 - methyl - 2 - isopropyl-1,3-propanediol.

*Product.*—2 - methyl - 2 - isopropyl - 1,3-propanediol, bis - (2,2,2 - trichloroethylcarbonate).

(B) *Starting material.*—2 - ethyl - 2 - isopropyl-1,3-propanediol.

*Product.*—2 - ethyl - 2 - isopropyl-1,3-propanediol, bis-(2,2,2-trichloroethylcarbonate).

(C) *Starting material.*—2 - methyl - 2n - butyl-1,3-propanediol.

*Product.*—2 - methyl - 2n - butyl-1,3-propanediol, bis-(2,2,2-trichloroethylcarbonate).

(D) *Starting material.*—2-methyl - ethyl-1,3-propanediol.

*Product.*—2 - methyl - 2 - ethyl - 1,3-propanediol, bis-(2,2,2-trichloroethylcarbonate).

EXAMPLE 5

*Preparation of 2,2,2-trichloroethyl chloroformate*

2,2,2-trichloroethanol (149.5 g., 1.0 mole) is added dropwise with stirring to 85 g. of liquid phosgene in a Dry Ice-trichloroethylene bath, maintaining a temperature of 0° or lower. The mixture is allowed to slowly reach room temperature upon completion of the addition while a calcium chloride protected outlet is employed to permit escape of excess phosgene. The mixture is then aerated and the 2,2,2-trichloroethyl chloroformate purified by distillation at reduced pressure.

What is claimed is:

1. A chemical compound of the formula:

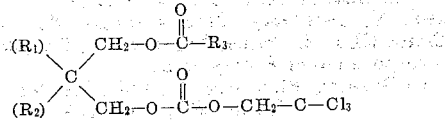

in which:
$R_1$ is methyl or ethyl,
$R_2$ is a lower alkyl group having from two to four carbon atoms, and
$R_3$ is $-O-CH_2-C-Cl_3$, $NH_2$ or $NHR_4$, $R_4$ being a lower alkyl group having from one to four carbon atoms.

2. 2 - methyl-2-propyl - 1,3 - propanediol, bis-(2,2,2-trichloroethylcarbonate).

3. 2 - methyl-2-propyl - 1,3 - propanediol, monocarbamate, 2,2,2-trichloroethylcarbonate.

4. 2 - methyl - 2 - propyl - 1,3 - propanediol, N-n-butyl-monocarbamate, 2,2,2-trichloroethylcarbonate.

References Cited

UNITED STATES PATENTS 2,711,997 6/1955 Trieschmann et al. ___ 260—463
2,937,119 5/1960 Berger et al. _____ 260—463 X CHARLES B. PARKER, *Primary Examiner.*

B. BILLIAN, *Assistant Examiner.*